(12) United States Patent
Colling

(10) Patent No.: US 7,320,504 B2
(45) Date of Patent: Jan. 22, 2008

(54) VEHICLE HEATER USING ENGINE EXHAUST

(75) Inventor: Robert E. Colling, Pocatello, ID (US)

(73) Assignee: Mobile Heat Exchange, LLC, Pocatello, ID (US)

( * ) Notice: Subject to any disclaimer, the term of this patent is extended or adjusted under 35 U.S.C. 154(b) by 244 days.

(21) Appl. No.: 11/207,136

(22) Filed: Aug. 18, 2005

(65) Prior Publication Data

US 2007/0057564 A1    Mar. 15, 2007

(51) Int. Cl.
*B60H 1/00* (2006.01)
(52) U.S. Cl. .................................................... 298/1 H
(58) Field of Classification Search ................ 298/1 H, 298/10
See application file for complete search history.

(56) References Cited

U.S. PATENT DOCUMENTS

| | | | | |
|---|---|---|---|---|
| 2,714,258 A * | 8/1955 | Smith et al. .................. 34/214 |
| 2,721,097 A | 10/1955 | Rittenhouse |
| 2,762,570 A | 9/1956 | Zimmerman |
| 2,925,301 A | 2/1960 | Milligan |
| 2,974,997 A | 3/1961 | Parsley et al. |
| 3,272,358 A * | 9/1966 | Thompson .................. 414/520 |
| 3,331,433 A | 7/1967 | Hagberg |
| 3,462,187 A * | 8/1969 | Hassler ..................... 296/183.2 |
| 3,472,548 A * | 10/1969 | Comisac .................. 296/183.2 |
| 3,499,678 A | 3/1970 | Richler |
| 3,897,972 A * | 8/1975 | Logue ..................... 296/183.1 |
| 4,273,381 A * | 6/1981 | Bibeau et al. .............. 298/1 H |
| 4,844,336 A * | 7/1989 | Huber et al. ........... 237/12.3 R |
| 5,038,018 A | 8/1991 | Grise et al. |
| 5,379,801 A * | 1/1995 | Reinhart et al. ............ 137/876 |
| 5,797,656 A * | 8/1998 | Kauk et al. ................. 298/1 H |

* cited by examiner

*Primary Examiner*—H Gutman
(74) *Attorney, Agent, or Firm*—Ormiston & McKinney, PLLC

(57) ABSTRACT

In one embodiment, a heater for a vehicle having an engine that generates hot exhaust gases includes a distribution pipe extending along a cargo carrying part of the vehicle. The distribution pipe is operatively connected to an engine exhaust pipe such that engine exhaust can flow through the distribution pipe when the engine is running. The distribution pipe has a plurality of openings therein through which exhaust is discharged to heat the cargo carrying part of the vehicle when the engine is running. Each opening has a cross-sectional area substantially smaller than a cross-sectional area of the distribution pipe.

19 Claims, 13 Drawing Sheets

VEHICLE HEATER USING ENGINE EXHAUST

BACKGROUND

Moist cargo materials hauled in dump bed trucks can freeze and stick to the truck bed in cold weather. Frozen cargo materials are difficult and sometimes dangerous to dump from the truck bed.

DETAILED DESCRIPTION

Embodiments of the invention were developed in an effort to make it easier and safer to dump frozen materials from a dump bed truck. Exemplary embodiments, therefore, will be described with reference to a dump bed truck. Embodiments of the invention, however, are not limited to use on dump bed trucks. Embodiments may be adapted for use with other exhaust generating vehicles including flat bed trucks, tractor-trailer rigs and pick-up trucks. The exemplary embodiments shown in the figures and described below illustrate but do not limit the invention. Other forms, details, and embodiments may be made and implemented. Hence, the following description should not be construed to limit the scope of the invention, which is defined in the claims that follow the description.

Figure 1:
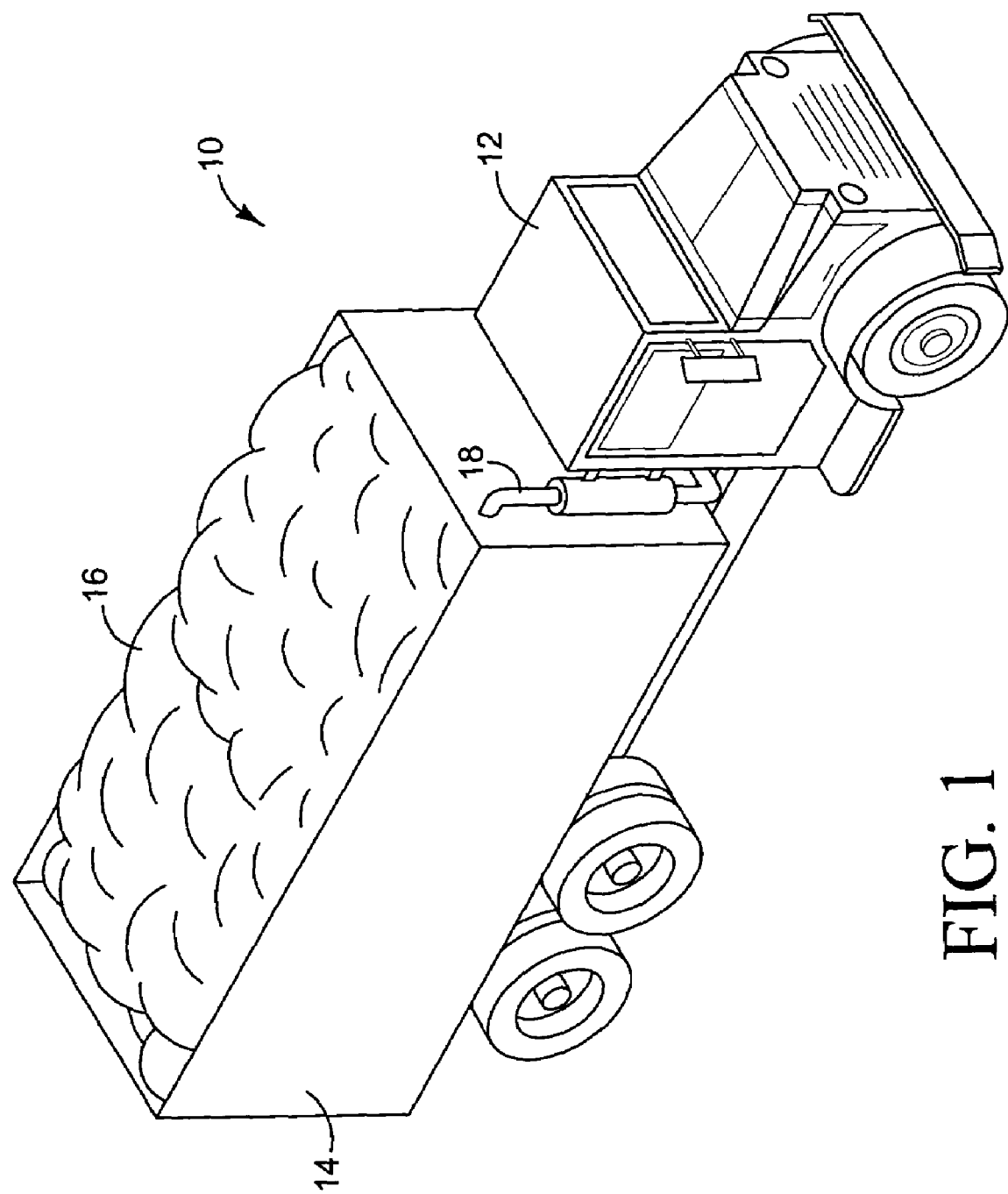
FIG. 1 illustrates one example of a dump bed truck that may be adapted for use with embodiments of the invention.
Figure 2:
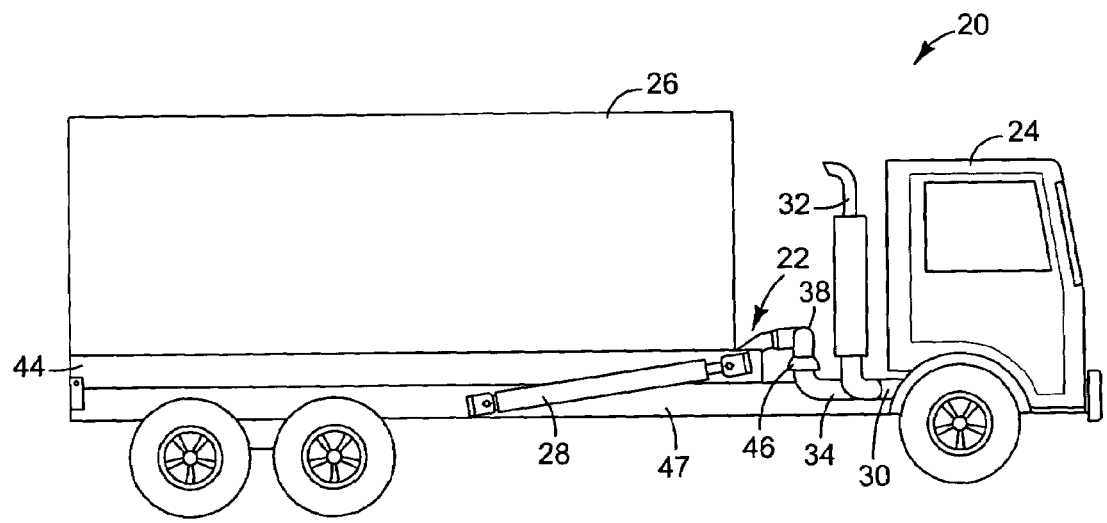
FIGS. 2-6 illustrate a dump bed truck with a truck bed heater constructed according to an embodiment of the invention.

FIG. 1 illustrates a dump bed truck 10 that may be adapted for use with embodiments of the invention. Truck 10 includes a cab 12 and a dump bed 14 containing cargo 16. The front of bed 14 may be hoisted up to dump cargo 16 out the back of bed 14. Truck 10 also includes an engine (not shown) that generates hot exhaust gases discharged through an exhaust stack 18. Dump bed truck 10 represents generally any vehicle that generates hot exhaust gases and includes a bed or container capable of holding cargo, including containers that are only temporarily attached to the truck (roll-on trash containers, for example).

Figure 3:
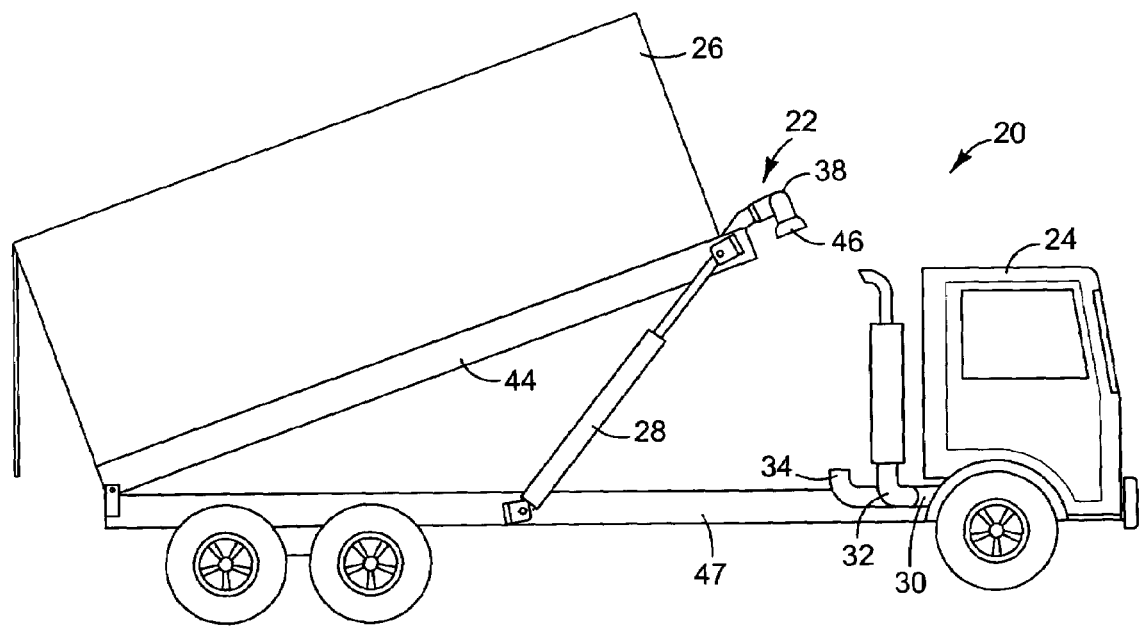
Figure 4:
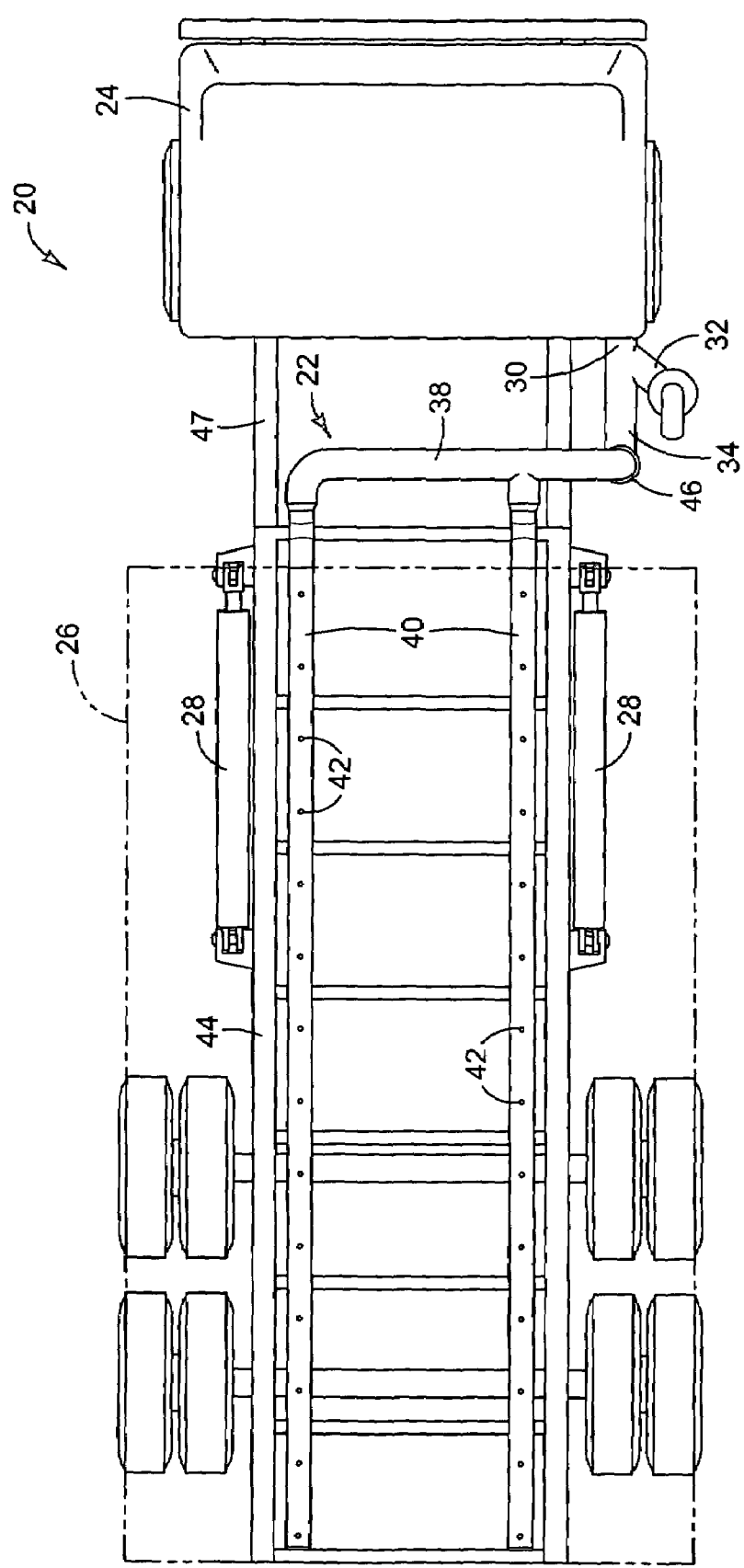
Figure 5:
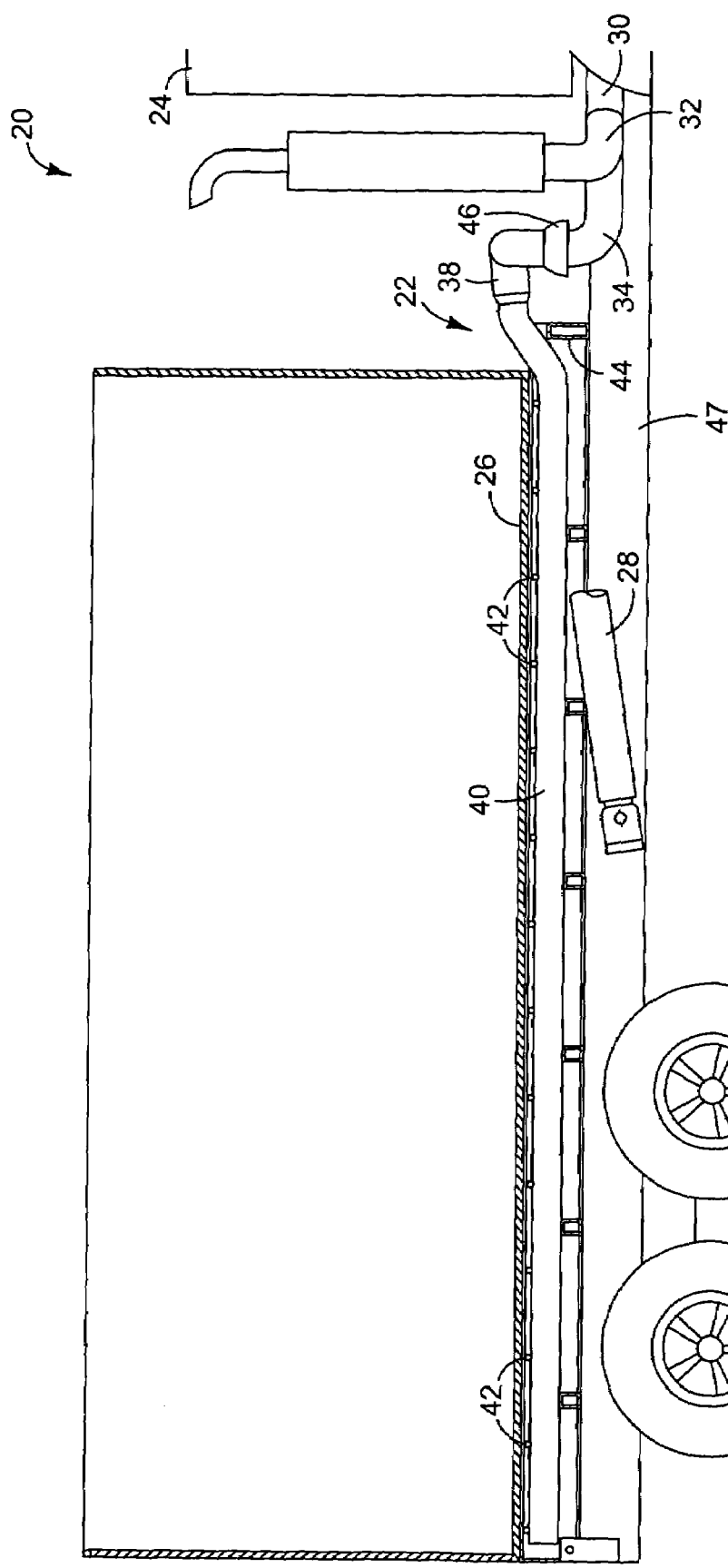
Figure 6:
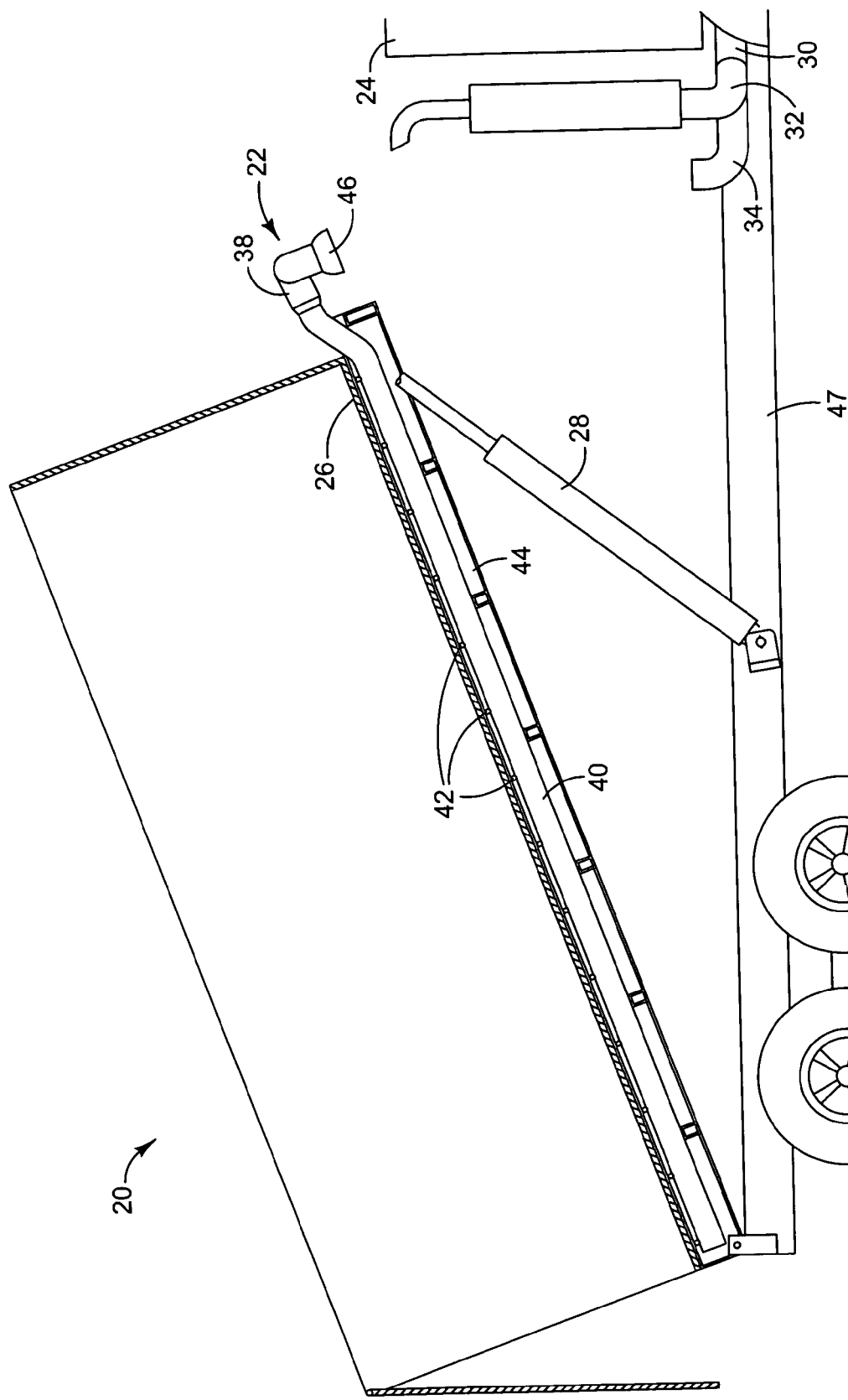

FIGS. 2-6 illustrate a dump bed truck 20 with a truck bed heater 22 constructed according to one embodiment of the invention. Only the outline of the truck bed is shown in the plan view of FIG. 4 so that the components of heater 22 under the bed are visible. The truck bed is shown in section in FIGS. 5 and 6. Referring to FIGS. 2-6, truck 20 includes a cab 24, a dump bed 26 and a hydraulic hoist 28 that lifts bed 26 as shown in FIGS. 3 and 6. The truck engine (not shown) discharges hot exhaust gases to an exhaust pipe 30.

Figure 7:
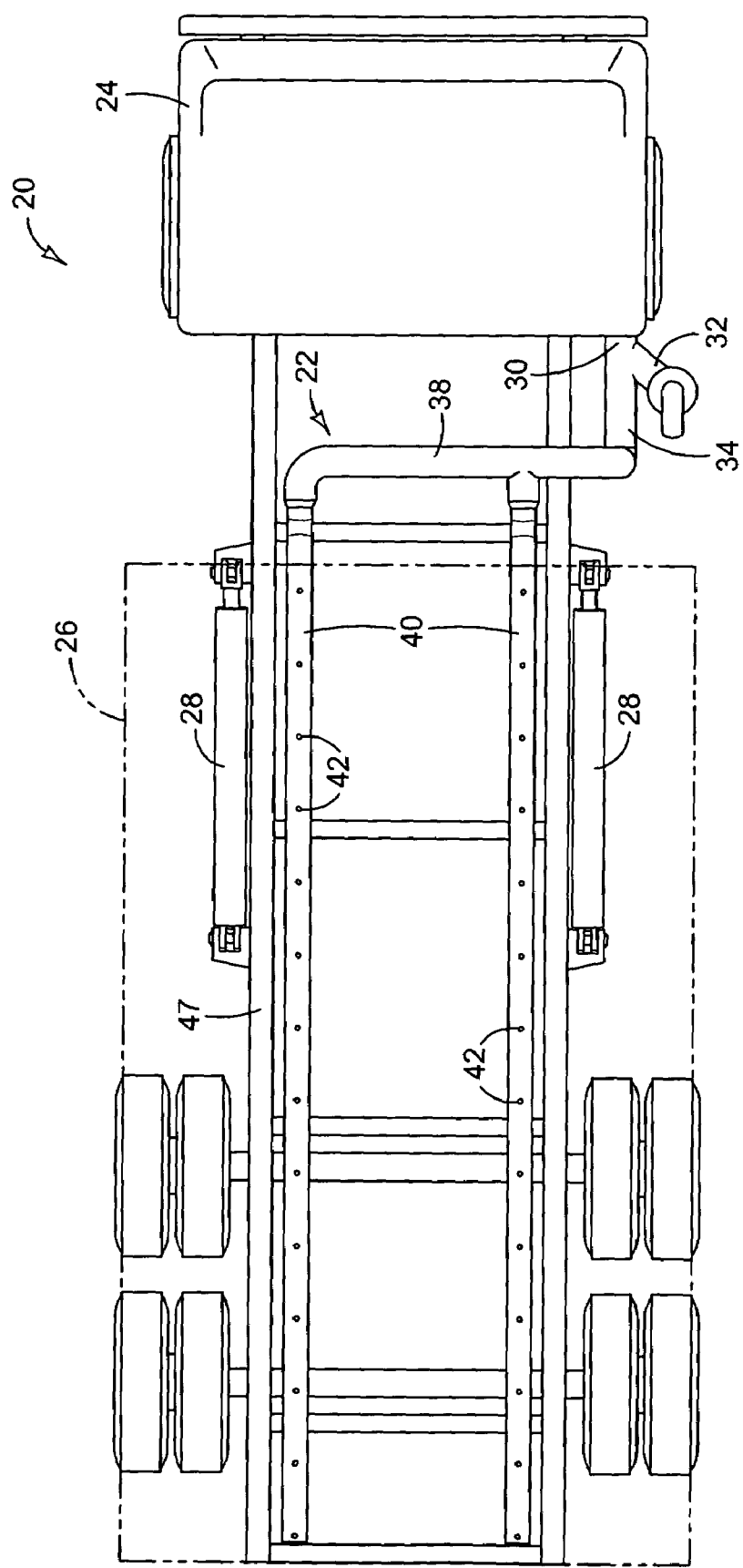
FIGS. 7-9 illustrate a dump bed truck with a truck bed heater constructed according to an embodiment of the invention.
Figure 8:
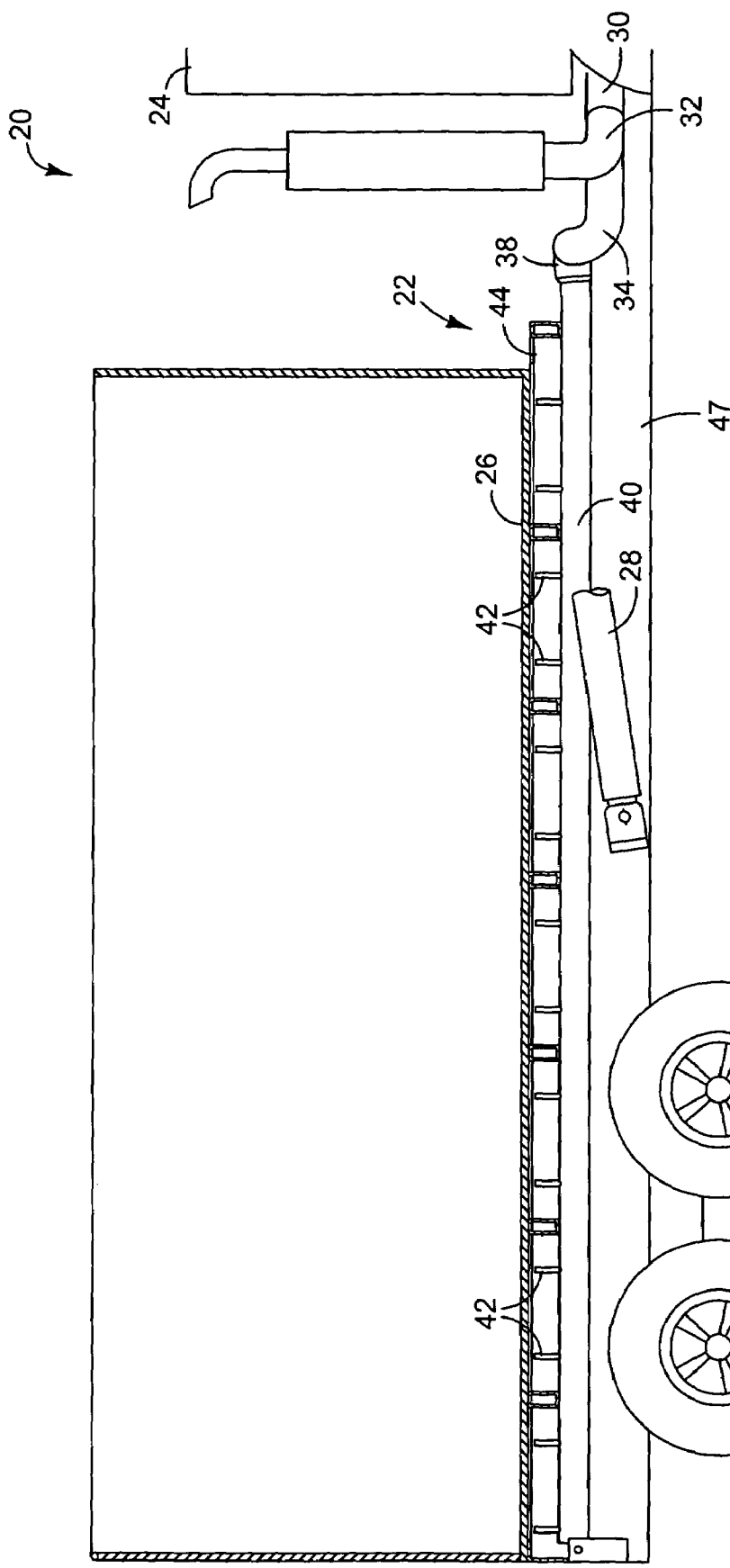
Figure 9:
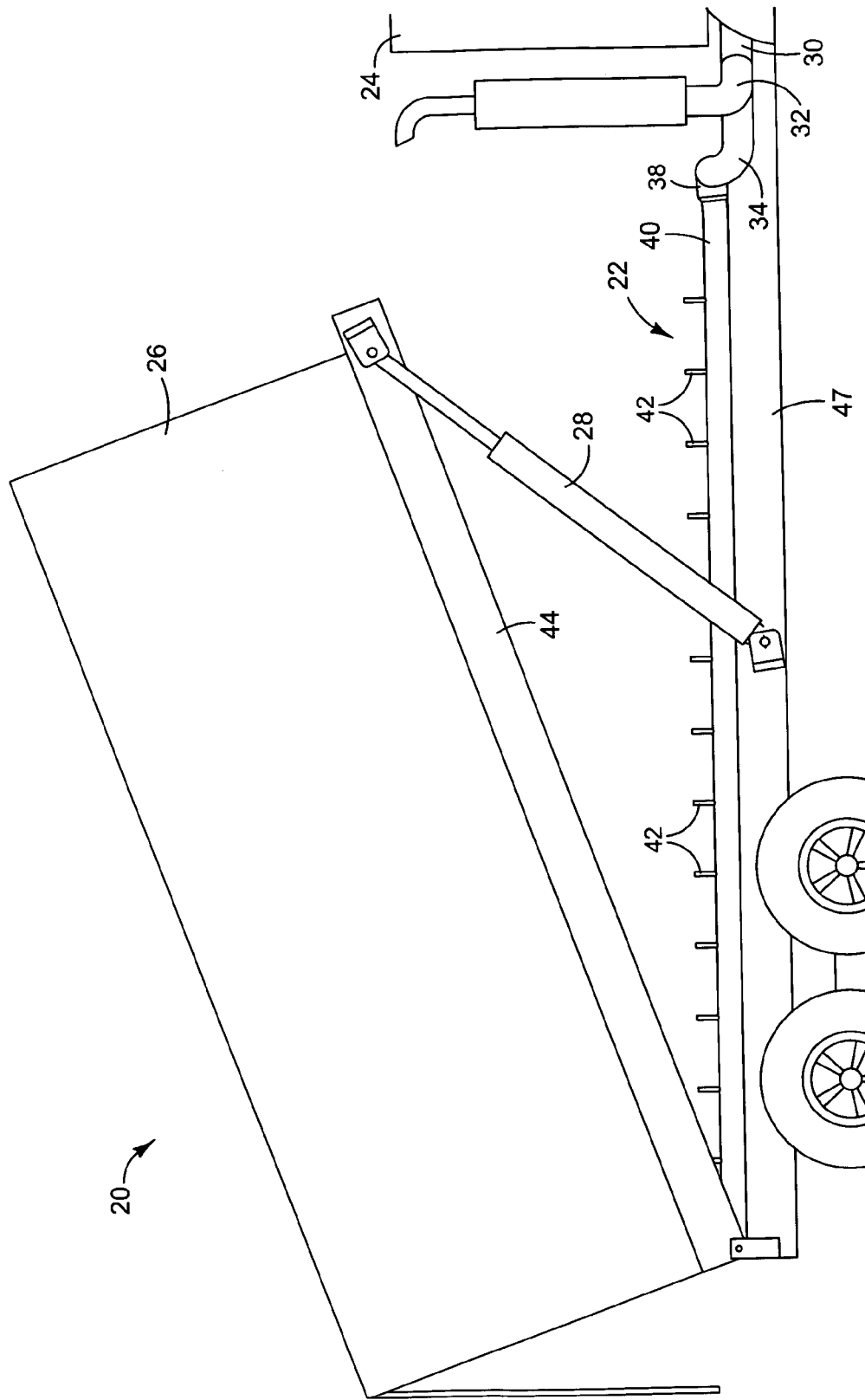

Exhaust pipe 30 carries exhaust to a muffler/stack 32 and/or to an intake pipe 34 for bed heater 22. A pair of butterfly valves 37 and 39 (FIGS. 13-14), for example, control the flow of exhaust from pipe 30 to stack 32 and intake pipe 34. Heater intake pipe 34 carries exhaust to a manifold 38 from which exhaust is channeled to jetted distribution pipes 40. In the embodiment shown, manifold 38 is a continuation of intake pipe 34. Hot exhaust gases are discharged from each distribution pipe 40 through a series of openings 42 extending along the length of pipes 40. Manifold 38 and distribution pipes 40 are mounted to a frame 44 that supports bed 26.

Where distribution pipes 40 are mounted to the movable dump bed frame 44, as shown in FIGS. 4-6, a quick disconnect 46 on intake pipe 34 allows bed heater 22 to more easily disconnect and connect to the truck exhaust as bed 26 is alternately raised and lowered. Quick disconnect 46 may include, for example, a hood that fits tightly down over the end of intake pipe 34 as best seen in FIGS. 5 and 6. The hood may be lined with rubber or another suitable sealing material to help seal the pipe connection at disconnect 46. In the embodiment shown in FIGS. 7-9, in which distribution pipes 40 are attached to the stationary truck frame 47, the quick disconnect is omitted.

In the embodiment shown in FIGS. 2-9, two distribution pipes 40 extend parallel to one another along nearly the full length of bed 26. Each pipe 40 is positioned approximately mid-way between the center of bed 26 and the sides of bed 26. Openings 42 are depicted in FIGS. 4 and 5 as a series of evenly spaced nozzles that direct the flow of gas up out of pipes 40 onto the bottom of bed 26. Other configurations are possible. Several factors may influence the configuration for any particular application including, for example, the size of the truck bed, the heat transfer characteristics of the bed, the nature of the cargo and the climatic conditions in which the bed will be used. Alternative configurations may include, for example, more or fewer distribution pipes, distribution pipes that diverge or converge along the length of the bed, more or fewer openings, openings that are clumped together along the pipe, and distribution pipes along the sides of the bed.

Figure 10:
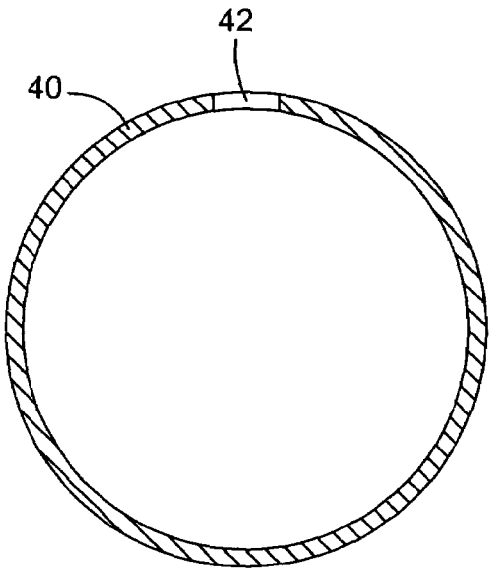
FIGS. 10-12 illustrate examples of discharge nozzles for the hot exhaust gases used to heat the truck bed.
Figure 11:
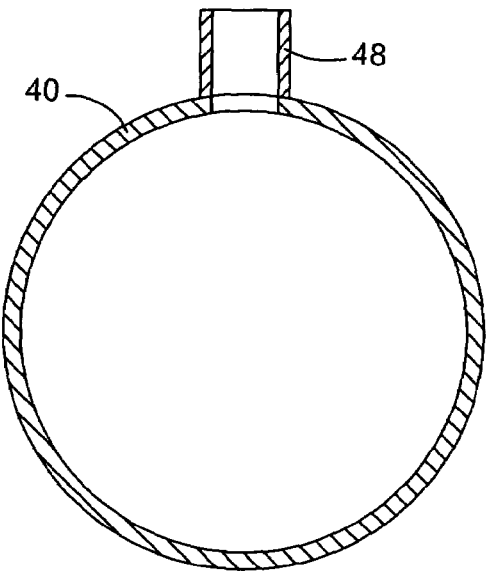
Figure 12:
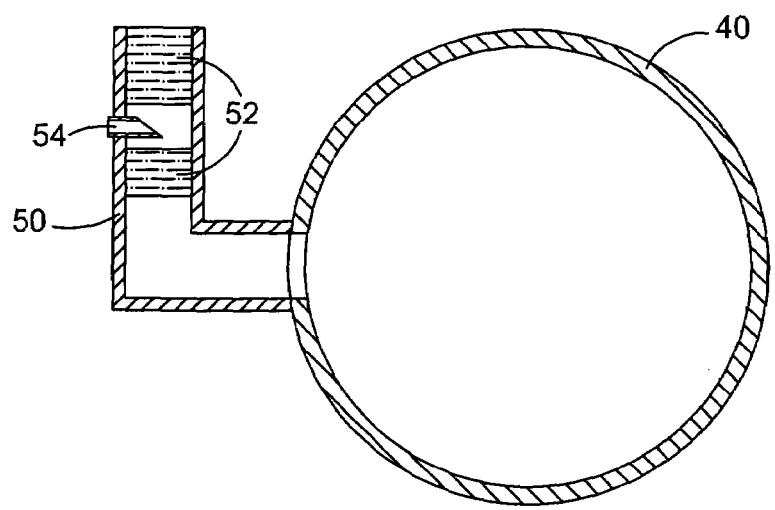

FIGS. 10-12 illustrate different exemplary embodiments for exhaust discharge openings 42 in distribution pipes 40. In the embodiment shown in FIG. 10, opening 42 is constructed as a simple opening in the top of pipe 40. In the embodiment shown in FIG. 11, opening 42 is constructed as a straight nozzle 48 protruding from the top of pipe 40. In the embodiment shown in FIG. 12, opening 42 is constructed as a nozzle 50 that protrudes horizontally from the side of pipe 40 and makes a 90° bend to vertical. Nozzle 50 in FIG. 12 includes an oxidizing catalyst 52 to increase the temperature of the exhaust gases discharged from nozzle 50. An air injection venturi 54 feeds air into catalyst 52 to aid oxidation.

Figure 14:
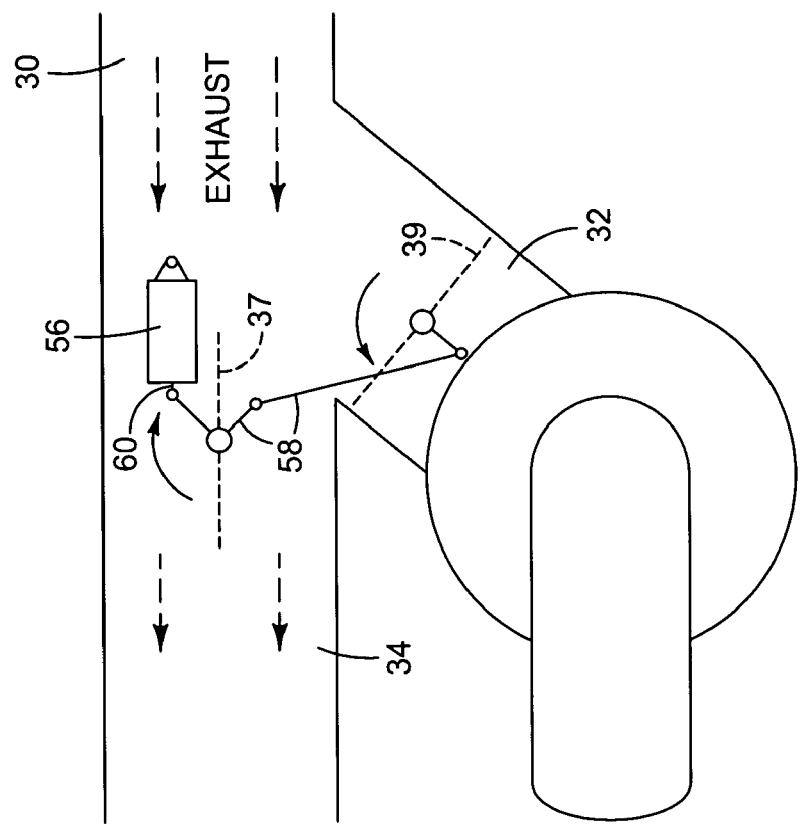
FIGS. 13-14 illustrate an arrangement of valves that may be used to control the flow of exhaust between the truck bed heater and the truck muffler and exhaust stack.
Figure 13:
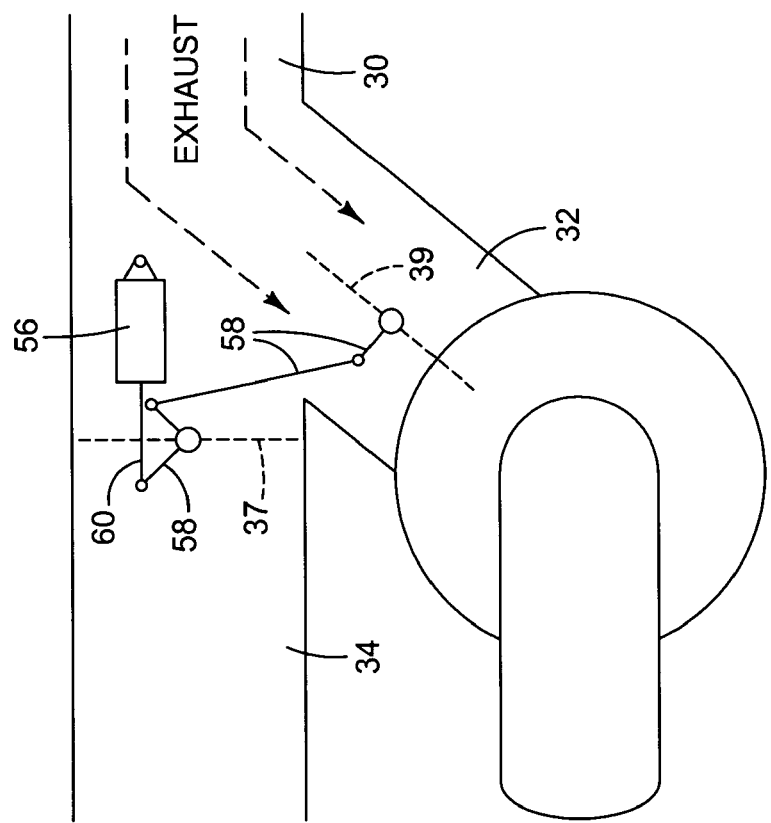

FIGS. 13 and 14 illustrate an arrangement of butterfly valves 37 and 39 for controlling the flow of engine exhaust from pipe 30 to heater intake pipe 34 and stack 32. Valves 37 and 39 are opened and closed by a solenoid 56 acting through a linkage 58 connecting solenoid 56 to each valve 37 and 39. In FIG. 13, solenoid slider 60 is fully extended so that valve 37 to heater intake pipe 34 is fully closed, valve 39 to stack 32 is fully open and all of the exhaust flows to stack 32. In FIG. 14, solenoid slider 60 is fully retracted so that valve 39 to stack 32 is closed, valve 37 to intake pipe 34 is open and all of the exhaust flows through intake pipe 34. It may be desirable under some operating conditions to have each valve 37, 39 partially open to split the flow of exhaust between stack 32 and heater intake pipe 34. In this way, the flow of hot exhaust gases to bed heater 22 may be regulated to help achieve the desired heating of bed 26. The valve control system illustrated in FIGS. 13-14 is just one example of a suitable control system. Other systems are possible. For example, the valves may be operated manually or each valve may be operated by its own solenoid and connecting linkage.

Figure 15:
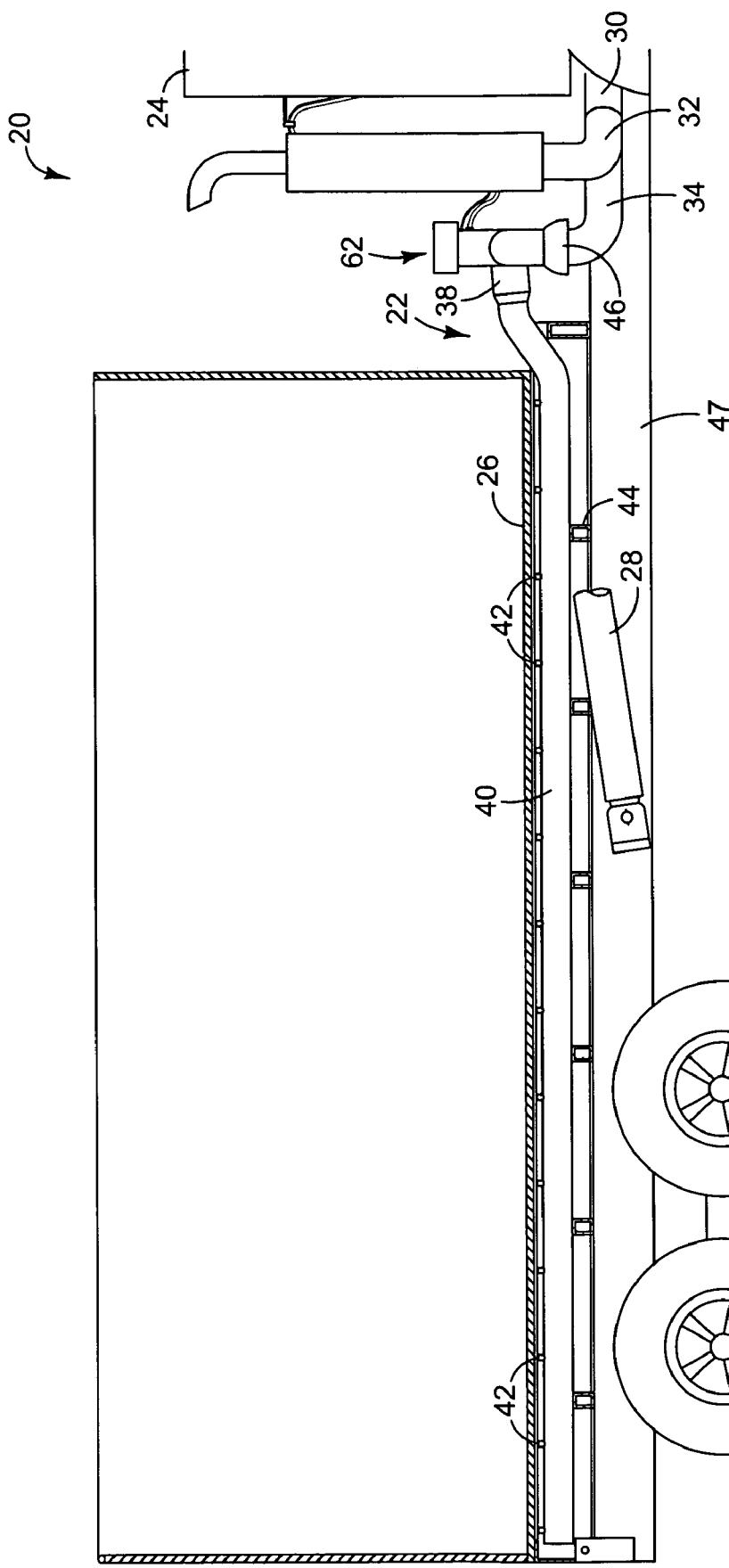
FIGS. 15-16 illustrate a dump bed truck with a truck bed heater constructed according to an embodiment of the invention.
Figure 16:
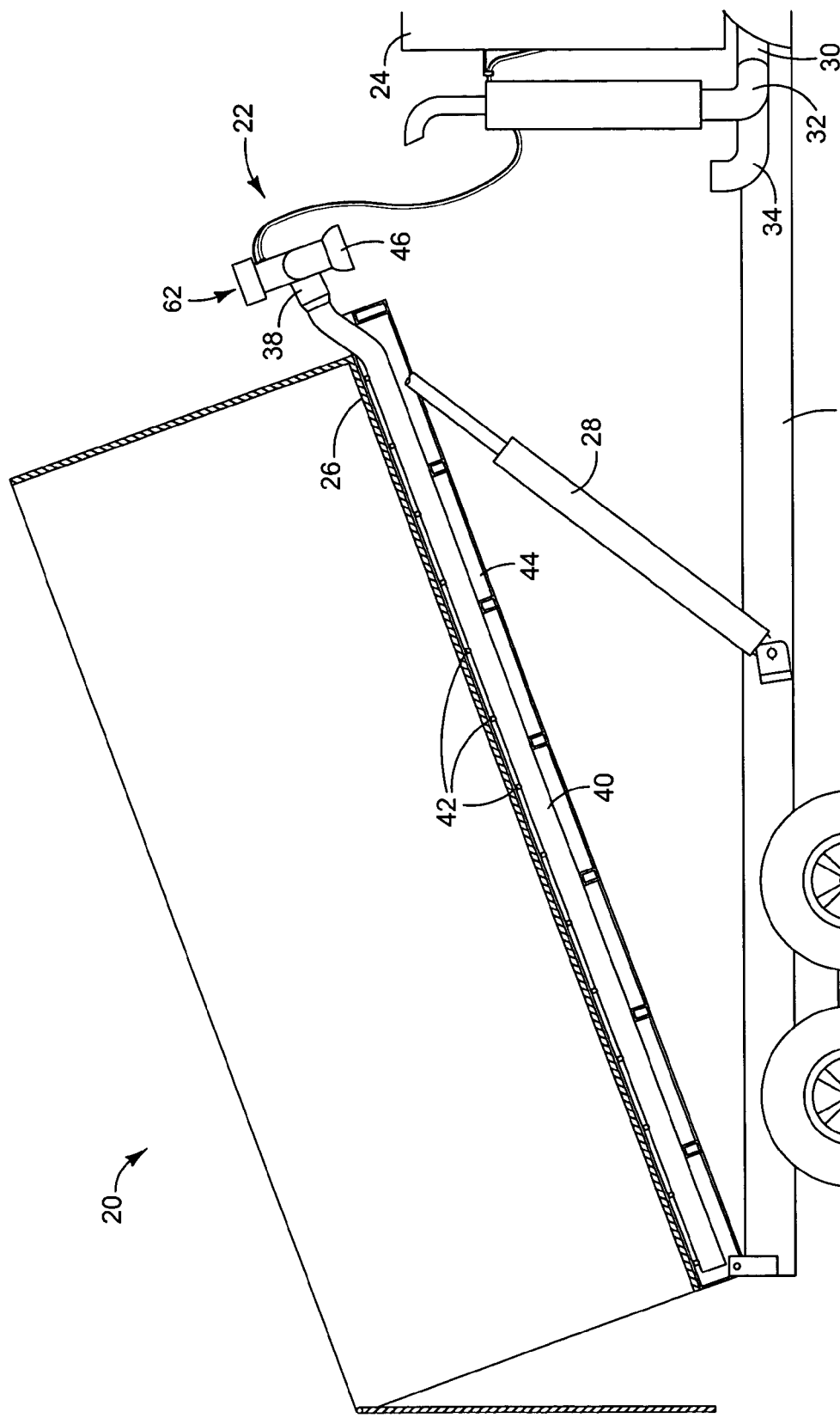
Figure 17:
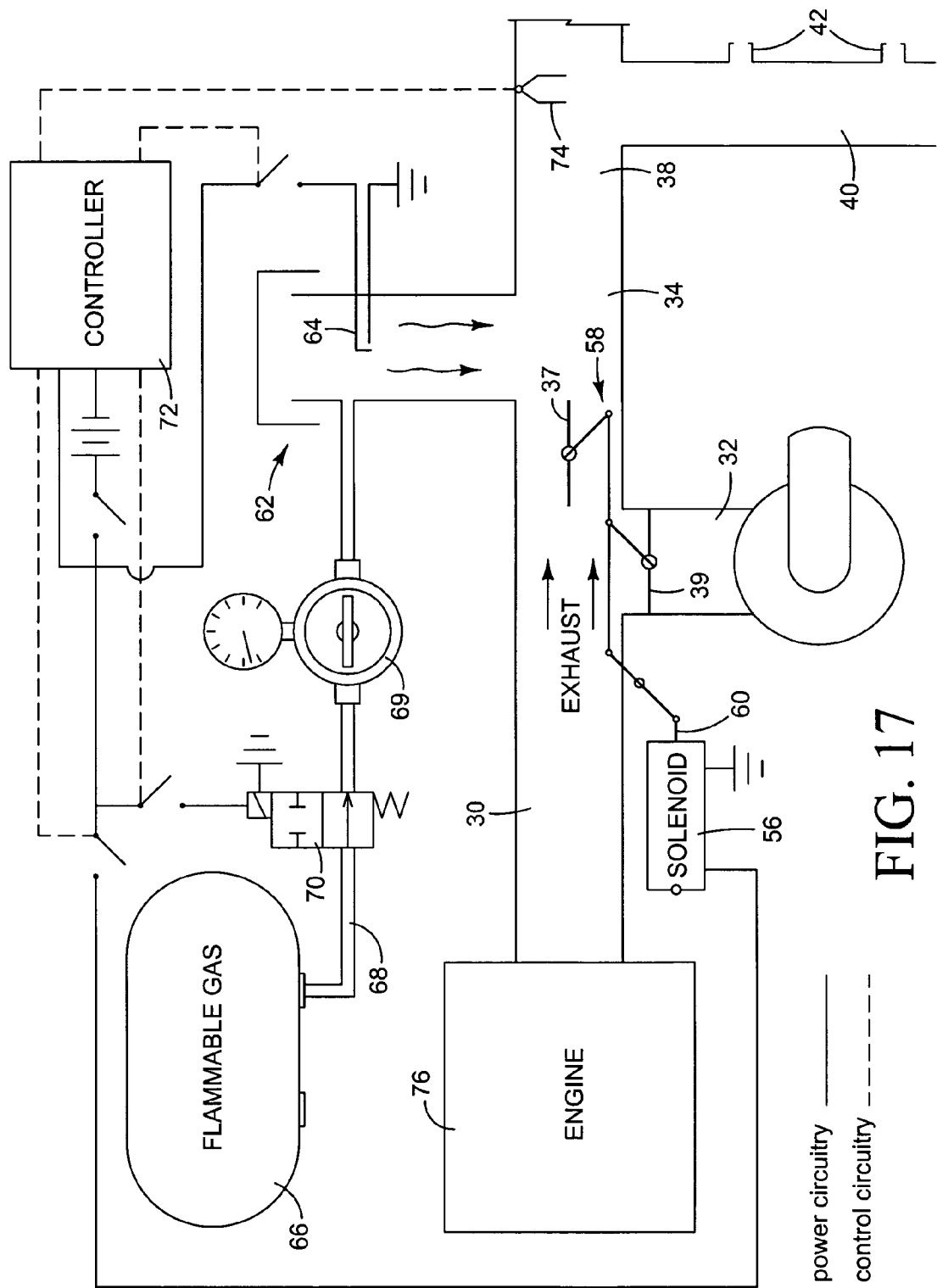
FIG. 17 illustrates a truck bed heating system according to an embodiment of the invention.

In the embodiment shown in FIGS. 15-16, a gas burner 62 is added to truck bed heater 22 to increase the temperature of the hot gases used to heat truck bed 26. FIG. 17 illustrates a control system for a gas burner assisted truck bed heater 22. Referring to FIGS. 15-17, gas burner 62 is connected to heater intake pipe 34. Burner 62 includes an electronic ignitor 64 to ignite natural gas, propane or another suitable gas delivered to burner 62 from gas tank 66 through a feed pipe 68. The flow of gas from tank 66 to burner 62 is controlled by a pressure regulator 69 and flow control valve 70. Where gas tank 66 is located remote from burner 62, mounted to the cab or truck frame for example, then a flexible tubing feed pipe 68 may be used along with a quick disconnect at control valve 70.

An electronic programmable controller 72 may be used to achieve the desired flow of hot gases to heater intake pipe 34 by regulating flows from the engine exhaust and heat from gas burner 62. Controller 72, therefore, is operatively connected to gas burner flow control valve 70, ignitor 64 and exhaust valve actuator solenoid 56. Gas burner 62 is one example of a secondary heat source that may be used to supplement the heat provided by exhaust from engine 76. Control inputs to controller 72 may include, for example, a temperature signal from a thermocouple 74 to monitor the temperature of gases entering manifold. 38, air temperature, truck bed temperatures, engine exhaust flow rates and temperatures, and gas burner temperature.

While the configuration of components of heater 22 may be varied to achieve a desired performance for a particular truck bed, it is expected that two 4"-5" diameter distribution pipes and a corresponding number of ¾"-1" diameter nozzles will adequately heat the floor of a typical roll-on trash container carried by a diesel fueled truck engine. In one example, heater manifold 38 is a 5" diameter steel pipe. Two 4" diameter steel distribution pipes 40 connected to manifold 38 extend along the full length of the trash container/bed 26. The floor of trash container dump bed 26 is 20'-0" long and 7'-0" wide and made from ³⁄₁₆" thick steel plate. Each distribution pipe 40 is positioned 2'-7" from the side of bed 26, leaving 1'-10" between pipes 40. Twelve 1" diameter nozzles 48 are spaced 1'-6" apart along the length of each distribution pipe 40. The tip of each nozzle 48 is approximately 3" below the underside of bed 26. The ratio between the cross-sectional area of each distribution pipe and the cross-sectional area of each opening or nozzle for such a trash container configuration is in the range of 16 (for a 4" diameter pipe and 1" nozzles) to 45 (for a 5" diameter pipe and ¾ nozzles).

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A heater for a vehicle having an engine that generates hot exhaust gases, the heater comprising:
   a plurality of distribution pipes configured to extend along a cargo carrying part of the vehicle;
   the distribution pipes configured for operative connection to an engine exhaust pipe such that engine exhaust can flow through the distribution pipes when the heater is installed on the vehicle and the engine is running;
   a manifold connected to an upstream end of each distribution pipe, the distribution pipes operatively connected to the engine exhaust pipe through the manifold when the heater is installed on the vehicle; and
   each distribution pipe having a plurality of openings therein through which exhaust is discharged to heat the cargo carrying part of the vehicle when the heater is installed on the vehicle and the engine is running, each opening having a cross-sectional area substantially smaller than a cross-sectional area of the distribution pipe.

2. The heater of claim 1, wherein the ratio between the cross-sectional area of each distribution pipe and the cross-sectional area of each opening is in the range of 16 to 45.

3. The heater of claim 1, wherein each opening comprises a nozzle through which exhaust is discharged against the cargo carrying part of the vehicle when the heater is installed on the vehicle and the engine is running.

4. A heater for a vehicle having an engine that generates hot exhaust gases, the heater comprising:
   a distribution pipe configured to extend along a cargo carrying part of the vehicle;
   the distribution pipe configured for operative connection to an engine exhaust pipe such that engine exhaust can flow through the distribution pipe when the heater is installed on the vehicle and the engine is running;
   the distribution pipe having a plurality of openings therein through which exhaust is discharged to heat the cargo carrying part of the vehicle when the heater is installed on the vehicle and the engine is running, each opening having a cross-sectional area substantially smaller than a cross-sectional area of the distribution pipe; and
   a valve operatively connected to the distribution pipe, the valve operative between a first position in which exhaust can flow to the distribution pipe when the heater is installed on the vehicle and a second position in which exhaust cannot flow to the distribution pipe when the heater is installed on the vehicle.

5. A heater for a vehicle having an engine that generates hot exhaust gases, the heater comprising:
   a plurality of distribution pipes extending along a cargo carrying part of the vehicle;
   a manifold connected to an upstream end of each distribution pipe;
   the distribution pipes operatively connected to an engine exhaust pipe through the manifold such that engine exhaust can flow through the distribution pipes when the engine is running; and
   each distribution having a plurality of openings therein through which exhaust is discharged to heat the cargo carrying part of the vehicle when the engine is running, each opening having a cross-sectional area substantially smaller than a cross-sectional area of the distribution pipe.

6. The heater of claim 5, wherein the ratio between the cross-sectional area of each distribution pipe and the cross-sectional area of each opening is in the range of 16 to 45.

7. The heater of claim 5, wherein each opening comprises a nozzle through which exhaust may be discharged against the cargo carrying part of the vehicle.

8. The heater of claim 5, wherein each distribution pipe extends along an underside of the cargo carrying part of the vehicle and the openings are located along a top of the distribution pipe such that gas may be discharged up through the openings against the underside of the cargo carrying part of the vehicle.

9. A heater for a vehicle having an engine that generates hot exhaust gases, the heater comprising:
   a distribution pipe extending along a cargo carrying part of the vehicle;
   the distribution pipe operatively connected to an engine exhaust pipe such that engine exhaust can flow through the distribution pipe when the engine is running;
   the distribution pipe having a plurality of openings therein through which exhaust is discharged to heat the cargo carrying part of the vehicle when the engine is running, each opening having a cross-sectional area substantially smaller than a cross-sectional area of the distribution pipe; and
   a valve interposed between the distribution pipe and the engine exhaust pipe, the valve operative between a first position in which exhaust can flow to the distribution pipe and a second position in which exhaust cannot flow to the distribution pipe.

10. A heater for a truck having a cargo carrying bed, comprising:
    an intake pipe connected to an engine exhaust pipe;
    a manifold connected to the intake pipe;
    a gas burner operatively connected to the intake pipe to heat exhaust flowing through the intake pipe;
    distribution pipes connected to the manifold and extending along the truck bed; and
    openings in each distribution pipe through which exhaust may be discharged against the truck bed.

11. The heater of claim 10, wherein the gas burner includes an ignitor, a gas flow control valve, and an electronic controller operatively connected to the ignitor and the gas flow control valve, the controller configured to selectively activate the burner in response to predetermined control inputs.

12. A heater for a truck having a cargo carrying bed, comprising:
    an intake pipe connected to an engine exhaust pipe;
    a manifold connected to the intake pipe;
    distribution pipes connected to the manifold and extending along the truck bed;
    nozzles protruding from each distribution pipe through which exhaust may be discharged against the truck bed; and
    an oxidizing catalyst in each nozzle.

13. A vehicle exhaust system, comprising:
    an intake pipe for collecting engine exhaust;
    a first exhaust discharge feature connected to the intake pipe through which exhaust may be discharged to the atmosphere;
    a second exhaust discharge feature connected to the intake pipe, the second discharge feature including a manifold and elongated distribution pipes connected to the manifold, each distribution pipe having a multiplicity of openings therein through which exhaust may be discharged to the atmosphere; and
    a valve operative between a first position in which exhaust can flow to the manifold but not through the first discharge feature and a second position in which exhaust can flow through the first discharge feature but not to the manifold.

14. The system of claim 13, wherein the valve comprises a first valve operatively connected to the first discharge feature and a second valve operatively connected to the second discharge feature, the valves operative together between the first position in which exhaust can flow to the manifold but not through the first discharge feature and the second position in which exhaust can flow through the first discharge feature but not to the manifold.

15. The system of claim 13, wherein the first discharge feature comprises an exhaust stack.

16. The system of claim 13, wherein the manifold comprises a continuation of the intake pipe.

17. A cargo carrier for a truck, comprising:
    a frame;
    a cargo carrying bed supported by the frame;
    pipes supported by the frame and extending along an underside of the bed for substantially the full length of the bed, each pipe having a multiplicity of openings therein oriented such that engine exhaust discharged through the openings is directed toward the underside of the bed; and
    a manifold connected to an upstream end of each pipe.

18. The carrier of claim 17, wherein the cargo carrying bed comprises a flat bed.

19. The carrier of claim 17, wherein the cargo carrying bed comprises a container.

* * * * *